United States Patent
Reid

[19]

[11] Patent Number: 6,055,144

[45] Date of Patent: Apr. 25, 2000

[54] ELECTRICAL POWER DISTRIBUTION SYSTEM UTILIZING CIRCUIT BREAKERS WITH INTERNAL CONTROL AND COMMUNICATION CIRCUITRY

[75] Inventor: Drew A. Reid, Brentwood, Tenn.

[73] Assignee: Square D Company, Palatine, Ill.

[21] Appl. No.: 08/767,172

[22] Filed: Dec. 16, 1996

Related U.S. Application Data

[63] Continuation of application No. 08/422,397, Apr. 14, 1995, abandoned, which is a continuation-in-part of application No. 08/330,407, Oct. 28, 1994, abandoned, which is a continuation of application No. 08/023,655, Feb. 26, 1993, abandoned.

[51] Int. Cl.$^7$ ...................................................... H02H 3/00
[52] U.S. Cl. ............................................................. 361/64
[58] Field of Search ................................. 361/78, 79, 86, 361/87, 93, 102, 114, 115, 93.1, 93.2, 93.3, 64, 66, 68, 69; 364/481, 483; 324/424

[56] References Cited

U.S. PATENT DOCUMENTS

| | | |
|---|---|---|
| 4,623,859 | 11/1986 | Erickson et al. . |
| 4,920,476 | 4/1990 | Brodsky et al. . |
| 5,038,246 | 8/1991 | Durivage, III . |
| 5,101,191 | 3/1992 | MacFadyen et al. ............. 340/310.01 |
| 5,151,842 | 9/1992 | DeBiasi et al. ........................... 361/93 |
| 5,180,050 | 1/1993 | Rada et al. . |
| 5,180,051 | 1/1993 | Cook et al. . |
| 5,231,565 | 7/1993 | Bilas et al. . |
| 5,301,083 | 4/1994 | Grass et al. . |
| 5,596,473 | 1/1997 | Johnson et al. ........................... 361/97 |

*Primary Examiner*—Ronald W. Leja
*Attorney, Agent, or Firm*—Kareem M. Irfan; Larry I. Golden

[57] ABSTRACT

The present invention provides an electrical power distribution system which contains a primary load-center (100) having a common data bus (124) that is adapted to provide two-way digital communication. A number of circuit breakers (120) are coupled to the common data bus (124). Each circuit breaker (120) has a first contact and second movable contact which is moved between a closed position and an open position by an actuator (216). The circuit breaker contains a microcontroller based control circuit (210), which controls the operation of the actuator (216) according to programmed instructions, which may be stored in a memory (234) contained in the circuit breaker or which are communicated to the circuit breaker over the common data bus (124). A status detection circuit (218) coupled to certain nodes within the circuit breaker provides status information about various contacts and current paths contained in the circuit breaker. Circuit breaker status information, configuration information and other desired information is stored in an internal memory (234). The circuit breaker may be adapted to communicate with other circuit breakers within load panel or directly with external devices. To expand circuit breaker capacity, a desired number of secondary load-centers (110*a*) may be coupled to the primary load center in a manner that will enable the circuit breakers in the secondary load centers to communicate over the common data bus (124).

15 Claims, 3 Drawing Sheets

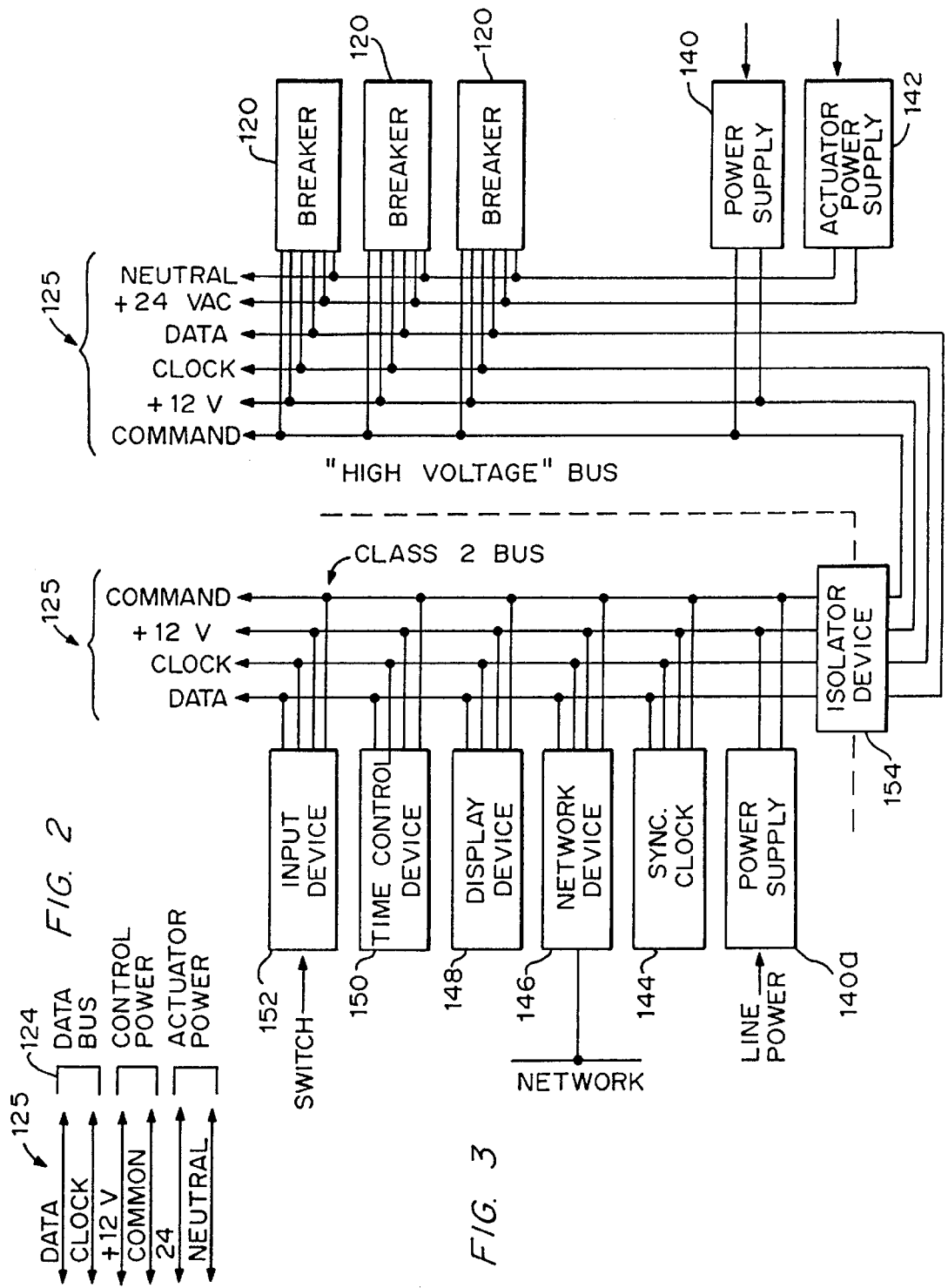

ELECTRICAL POWER DISTRIBUTION SYSTEM UTILIZING CIRCUIT BREAKERS WITH INTERNAL CONTROL AND COMMUNICATION CIRCUITRY

CROSS-REFERENCE TO RELATED APPLICATIONS

This application is a continuation of U.S. patent application Ser. No. 08/422,397, filed on Apr. 14, 1995, now abandoned, which is a continuation-in-part of U.S. patent application Ser. No. 08/330,407, filed on Oct. 28, 1994, now abandoned, which is a continuation of U.S. patent application Ser. No. 08/023,655, filed on Feb. 26, 1993, now abandoned.

BACKGROUND OF THE INVENTION

1. FIELD OF THE INVENTION

This invention relates generally to circuit breakers and more particularly to an electrical distribution system utilizing a novel circuit breaker having internal control and communication circuit means.

2. DESCRIPTION OF THE RELATED ART

Circuit breakers are commonly used for temporary interruption of electrical power to electrical devices (loads). Modern circuit breaker systems utilize a plurality of remotely controlled circuit breakers for programmable control of lighting and other devices in commercial and industrial applications. Selectively opening and closing the various circuit breakers in a system provides energy savings and ease of operation over manually operated circuit breakers.

Remotely controlled circuit breaker systems typically include a circuit breaker load-center or panel having a plurality of remotely controllable circuit breaker. U.S. Pat. No. 4,920,476 issued to Brodsky et al. on Apr. 24, 1990 shows a circuit breaker system wherein the wiring is accomplished by using a patch-board within the load-center. Other systems use hand-wiring between each circuit breaker input\output and a terminal in a remotely located control means. Such systems are not flexible, in that each time the circuit breaker control requirements change, the wiring and many system components must be reconfigured or replaced.

U.S. Pat. No. 5,231,565 issued to Bilas et al. on Jul. 27, 1993, which is assigned to the assignee of this application, provides an electrical power distribution system which includes multiple remotely controllable circuit breakers, each of which is operable by a control circuit contained within the load-center in at least an open and a closed position. A termination circuit within the control circuit interprets circuit breaker control signals from external switch devices. Data paths are provided for receiving programming instructions and signals from external devices. A switch input data path coupled to the control circuit carries circuit breaker switching instructions to the individual circuit breakers.

The electrical power distribution system provided by Bilas solves many of the problems of the previous systems. However, the wiring, although simplified through a pre-wired bus, is a limiting factor in the number of circuit breakers that can be controlled from the control circuit. Such systems also contain complex control and interface modules in the load-center for controlling individual circuit breakers and for providing communication with external devices, such as a computer.

The above described electrical power distribution systems generally utilize remotely controllable electromechanical circuit breakers, which are caused to open and close by an external control circuit. More commonly used remotely controllable circuit breakers either contain a solenoid or motor as an actuator, which causes a movable contact to move between an open and a closed position. The operation of the actuator is controlled by an external control circuit. An example of a motor operated circuit breaker is found in U.S. Pat. No. 5,180,051, issued to Cook et al. on Jan. 19, 1993, which is assigned to the assignee of this application, and is incorporated herein by reference.

A state-of-the-art electrical power distribution system is available from Square D Company, Palatine, Ill., under the tradename "PowerLink." In the PowerLink system, a plurality of circuit breakers, such as described by Cook, a control module and an interface circuit module are arranged within a panel enclosure. The control and interface modules control the operation of the circuit breakers and provide twoway communications with any external devices, including any remote control and display means, such as a computer. This is because the individual circuit breakers have little or no internal or local circuitry or intelligence, and, thus, they must be used with external control circuits designed to control such circuit breakers.

More recently, attempts have been made to have circuit breakers which have certain internal capabilities. For example, U.S. patent application Ser. No. 08/023,655, filed on Feb. 26, 1993, naming the inventor of this application as a co-inventor and assigned to the assignee of this application, provides a remotely controllable circuit breaker which incorporates a non-volatile memory for storing therein circuit-monitoring, circuit breaker configuration and certain other circuit breaker information. When such a circuit breaker is used in an electrical power distribution, it communicates with the control circuit of such system to store a wide variety of information in the non-volatile memory.

The electric power distribution systems, utilizing any of the above-noted remotely controllable circuit breakers, however, still are very complex, contain complex control and interface circuitry, and contain a complex data bus. Furthermore, when only a few remotely controllable circuit breakers are desired for a particular application, the entire distribution circuit-panel containing the control circuit must be installed, which can be very expensive and for many applications may not be economically feasible.

Consequently, a need exists for an improved electrical power distribution system which overcomes the above-noted deficiencies. The present invention provides an electrical power distribution system which utilizes a novel circuit breaker, which contains local control and communications circuits for controlling the operation of the circuit breaker and for communicating over a common data bus with other circuit breakers within the electrical power distribution system, external devices, and a remote control and monitoring means, such as a computer.

SUMMARY OF THE INVENTION

The present invention provides an electrical distribution system having a circuit breaker load-center containing a plurality of circuit breakers coupled to a common data bus. The common data bus is adapted to provide two-way digital communication between the circuit breakers and external devices. Each circuit breaker has a first contact and second movable contact, which is moved between a closed position and an open position by an actuator. The circuit breaker contains a microcontroller based control circuit, which controls the operation of the actuator according to programmed instructions, which instructions may be stored in a memory contained in the circuit breaker or communicated to the circuit breaker by external control means over the common data bus. A status detection circuit coupled to desired nodes within the circuit breaker provides status information about various contacts and current paths contained in the circuit breaker. Circuit breaker status information, configuration information and other desired information is stored in an internal memory. The circuit breaker may be adapted to communicate with other circuit breakers within the load-center and directly with external devices. To increase the circuit breaker capacity, additional circuit breaker panels may be coupled to the load-center to communicate over the data bus.

Examples of the more important features of the invention thus have been summarized rather broadly in order that detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein:

FIG. 2 shows a schematic diagram of an exemplary control and data bus for use in the electrical power distribution system shown in FIG. 1.

FIG. 3 is a block circuit diagram showing the interconnection of various system elements and devices with the control and data bus of FIG. 2.

DESCRIPTION OF THE PREFERRED EMBODIMENT

In general, the electrical power distribution system of the present invention contains a load-center having a plurality of circuit breakers which may communicate with each other, with an interface circuit contained in the load-center, with other devices external to the circuit breakers, and with a remote control means, such as a computer, over a common data bus for interrupting electrical paths to loads coupled to such circuit breakers according to programmed instruction stored within the circuit breakers and/or instructions provided by an external means. Each circuit breaker contains a microcontroller based circuitry to cause an actuator, such as a motor or a solenoid, within the circuit breaker, to switch the circuit breaker between an open and a closed position.

Figure 1:
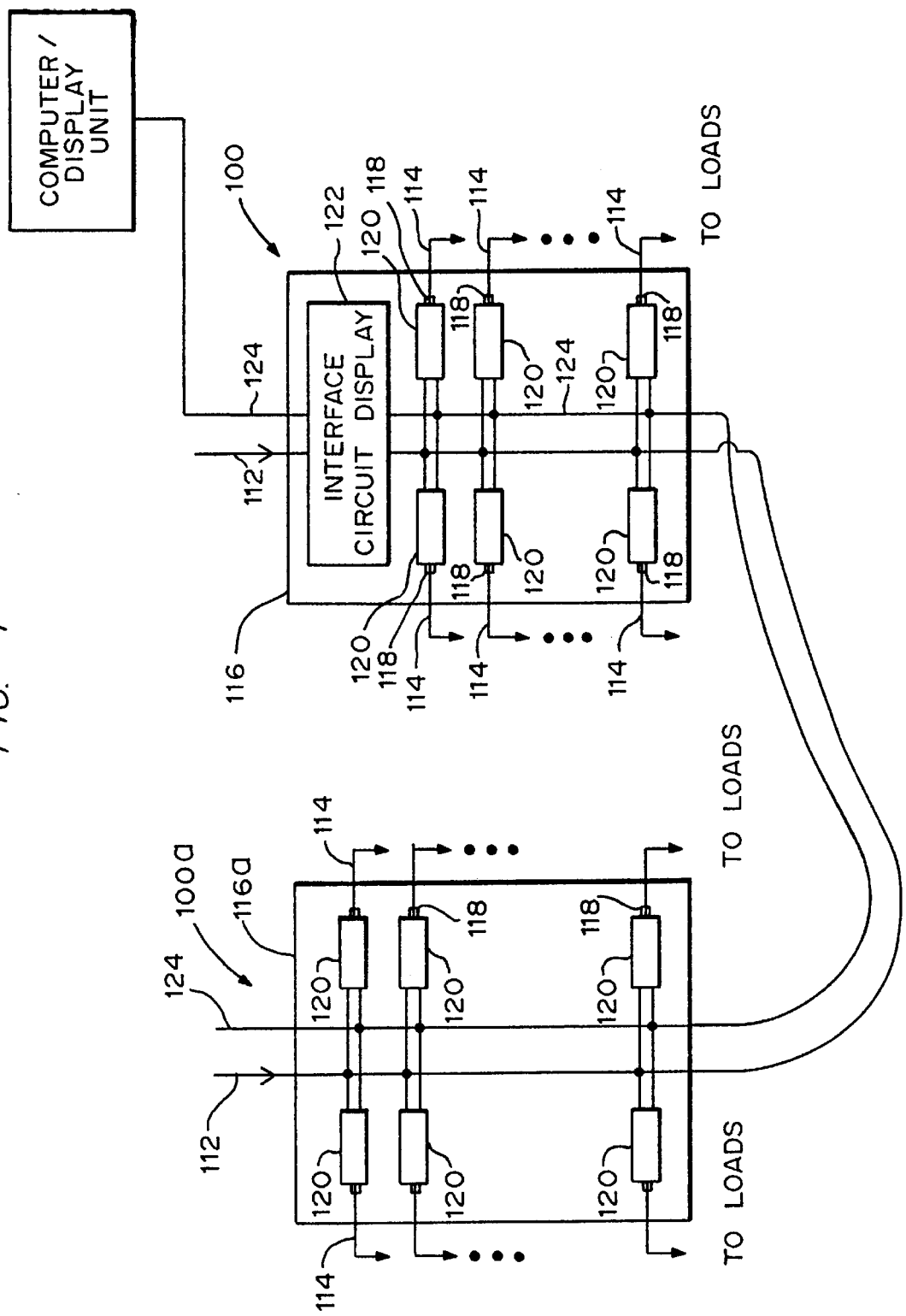
FIG. 1 shows a schematic block diagram of an exemplary electrical power distribution system according to the present invention, which contains a primary load-center and a secondary load-center coupled to a remote control/monitor unit and wherein the various circuit breakers communicate over a common data bus.

Turning now to the drawings, FIG. 1 shows a schematic block diagram of an exemplary circuit breaker system according to the present invention. The circuit breaker system contains a primary load-center 100 having a panel enclosure 116 containing a plurality of circuit breakers 120 coupled to a data bus 124 preferably a common data bus. An interface circuit and display 122 communicates with each of the circuit breakers 120 via the data bus 124. A computer/display unit 126, typically placed at a distant location from the load-center 100, may communicate over the data bus 124 with each of the circuit breakers directly or via the interface circuit 122. Each circuit breaker 120 may be programmed to have a unique address to which it will respond and which address also may be stored in the computer/display unit 126. A plurality of power lines or a power bus 112 coupled to a power source (not shown) provides power to an input terminal of each of the circuit breakers 120. An output terminal 118 of each of the circuit breakers is coupled to an associated load 114. Commonly used circuit breaker enclosures have limited space capacity and if additional circuit breakers are desired for a particular application, additional load-centers, such as a load-center 100a (secondary load-center) containing an enclosure 116a and having a desired number of additional circuit breakers 120 placed within the enclosure 116a in the manner described for the load-center 100 above may be serially coupled to the load-center 100. In such an arrangement, the data bus 124 is extended to the circuit breakers 120 in the load-center loa. Additional secondary load-centers may be used, in the manner described above, to further increase the circuit-breaker capacity.

FIG. 2 shows an example of a control and data bus 125 for use in the electrical power distribution system of FIG. 1. The control and data bus 125 contains a common data bus 124 for carrying data signals to and from the circuit breakers 120 on a "DATA" line and clock signals on a "CLOCK" line. A desired low voltage, which is generally 12 volts, is supplied on line "+12 v" to the circuit-components of the circuit breakers 120, while line designated as "24 vac" carries the desired power, which is generally 24 vac, to the actuators contained in the circuit breakers 120.

FIG. 3 is a block schematic diagram showing the interconnection of various devices and the circuit breakers 120 with the control and data bus 125. A power supply 140 preferably provides the desired low voltage power to electronic components of the devices coupled to the data bus 124 of the electrical power distribution system 100. Additional power supplies, such as a power supply 140a, may be used to increase the power supply capacity and/or supply power to isolated segments of the data bus 124. An actuator power supply 142 provides the desired power to energize the actuating devices contained in the circuit breakers 120, which are preferably either electrical motors or solenoids.

A communication device located in the interface circuit 122 may be coupled to the data bus 124 for converting bus data to other data protocols and/or electrical formats for communications with a remote control means, such as the computer/display unit 126. A synchronous clock device 144 is used if the system is designed to use a synchronous protocol. A time control device 150 coupled to the data bus 124 may be configured to provide control signals to the data bus 124 according to predetermined time of the day schedules. As shown in FIG. 1, a computer/display unit 126 may be coupled to the circuit breakers 120 via the data 124 bus to monitor status of the individual circuit breakers 120 and to provide instructions to such circuit breakers. Additionally, a display device 148, preferably placed within the enclosure 116 may be coupled to the circuit breakers for local control and for displaying the status of individual circuit breakers in the system. Typically, a single display device, preferably placed in the primary load-center, is sufficient to monitor and control the circuit breakers contained in a plurality of serially coupled load-centers.

Still referring to FIG. 3, external devices, such as switches, which control the turning on and off of the loads, such as the lighting and other electrical equipment, are coupled to the circuit breakers 120 via an input device 152, which provides signals corresponding to the "on" and "off" state of such switches to their corresponding circuit breakers. An isolator device 154 provides electrical isolation of data bus segments from power lines 112 contained in the enclosure 110 (see FIG. 1). The above described system elements may be arranged within or outside the circuit-breaker panel 116.

The electrical power distribution system described above will function when circuit breakers 120 can communicate with other devices over the data bus 124. The present invention provides a novel circuit breaker for use in the electrical power distribution system of the present invention, which will now be described in detail.

In general, the preferred circuit breaker 120 according to the present invention contains electromechanical components and a control and communication circuit means arranged in common housing or enclosure. Means within the circuit breaker are provided for suitably interconnecting the circuit breaker to the control and data bus 125. The electromechanical part of the circuit breaker preferably contains one or more sets of contacts, whose purpose is to interrupt current flow through a current path. Preferably, one set of such contacts contains a first contact and a second movable contact, which is moved between an open and a closed position by an actuator, whose operation is controlled by the control circuit contained in the circuit breaker. An electric motor or a solenoid is preferably used as the actuator. The circuit breaker preferably contains at least one set of contacts which is responsive to thermal influences generated by the current passing through the circuit breaker to cause the current path to be interrupted when the temperature of such contact reaches a predetermined (threshold) level. The circuit breaker preferably contains at least one set of contacts that is responsive to magnetic flux influences, which interrupts the current path through the circuit breaker when the current suddenly exceeds a predetermined value. The same set of contacts, however, may be made responsive to both the thermal and magnetic influences. Certain contacts within the circuit breaker may also be made responsive to external mechanical means, such as a toggle switch, which can be activated manually to cause the current path through the circuit breaker to be interrupted.

An example of a circuit breaker utilizing an electric motor as the actuator and having the contacts described above is found in U.S. Pat. No. 5,180,051, issued to Cook et al. on Jan. 19, 1993, which is assigned to the assignee of this application. The U.S. Pat. No. 5,180,051 is incorporated herein by reference for all purposes. The electro-mechanical elements, such as shown in the Cook circuit breaker, and the circuit means which controls the operation of the circuit breaker and which communicates with external devices over the data bus may be suitably arranged within a common housing having a terminal port through which access may be provided to the common data bus. The elements and the operation of the circuit means contained in the circuit breaker of the present invention will now be described while referring to FIGS. 1–4.

Figure 4:
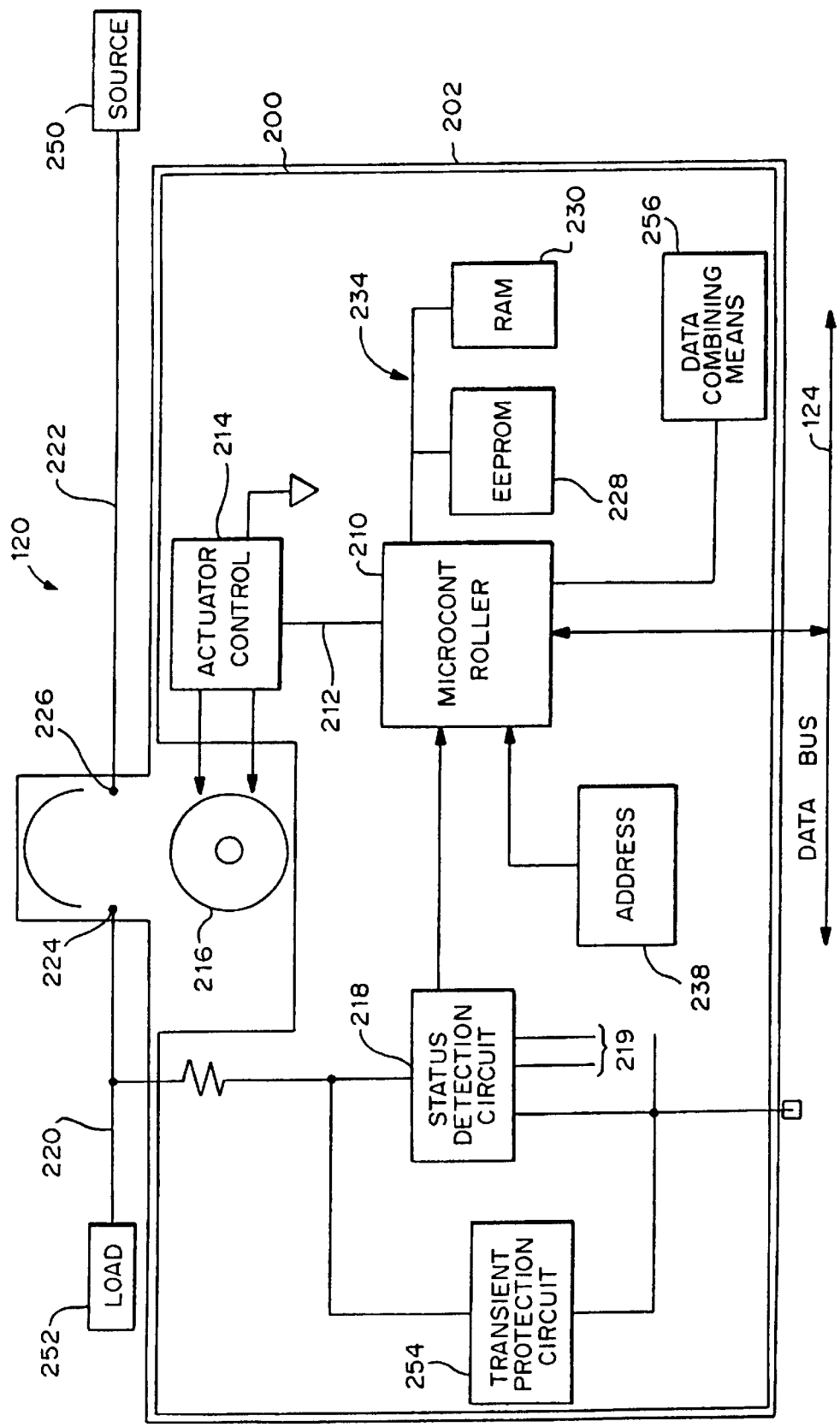
FIG. 4 shows a block circuit diagram of a circuit breaker according to the present invention.

FIG. 4 shows a block diagram of the circuit breaker 120 according to the present invention having an actuator 216 and a circuit means 200 arranged in a common housing 202. The circuit means 200 contains a microcontroller 210 for controlling the operation of the circuit breaker 120 and for providing two-way communication (exchange of information) over the data bus 124 with other devices, such as other circuit breakers in the electrical power distribution system, the interface circuit and display 122, and/or the computer/display unit 126 (see FIG. 1), and other desired external devices, such as shown in FIG. 3. An actuator control circuit 214 coupled to the microcontroller 210 via a line 212 causes the actuator 216 to move a movable contact 224 coupled thereto between an open position (as shown in FIG. 4) and a closed position in accordance with programmed instructions. In the closed position, the movable contact 224 is in contact with the contact 226. When the circuit breaker is closed, the current flows from a power source 250 to a load 252 associated with the circuit breaker via lines 220 and 222.

The actuator 216 may be commanded remotely to move the movable contact 224 between the open and closed positions or it may be made responsive to internal signals generated by the microcontroller 210. The actuator 216 may be implemented by using a rotary electromagnetic device, such as a motor, a linear electromagnetic device, such as a solenoid, a non-magnetic device, such as a "memory metal", whose shape is affected by heating it via a current pulse or any other desired device.

A status detection circuit 218 coupled to the microcontroller 210 provides information to the microcontroller about the state of one or more internal contacts and/or current paths in the circuit breaker 120. The status detection circuit 218 preferably senses voltage or current on the load line 220 via a voltage sensing means, which may be implemented by using an opto-coupler. The status detection circuit 218 also may provide status of any or all current carrying contacts within the circuit breaker 120, which may be implemented by measuring the voltage on appropriate nodes within the current carrying paths of the circuit breaker 120. The status detection circuit 218 also may provide signals to the microcontroller 210 which are representative of the status of various other elements of the circuit breaker 120, such as any mechanical override means used in the circuit breaker 120, contacts that may be isolated from the primary current carrying path 220. Lines 119 indicate status inputs from such other elements to the status detection circuit 218. However, for simplicity and not as a limitation, the status detection circuit 218 is shown coupled only to the load line 220. A transient protection circuit 254 may be provided for protecting the status detection circuit 218 from any transients present in various current paths associated with the circuit breaker 120.

The status detection circuit 218 obtains signals from each of the desired contacts or current carrying paths and provides signals representative of the status of such contacts and current carrying paths to the microcontroller 210. Electrical signals provided by the status detection circuit 218 may be used internally, i.e., by the microcontroller 210, and/or provided via the data bus 124 to other devices that are external to the circuit breaker, such as the interface display circuit 122 and the computer/display unit 126. Additionally, the status detection circuit 218 may be adapted to determine the actuator position.

A memory means 234 coupled to the microcontroller 210 stores desired programmed instructions and information about the circuit breaker and the electrical power distribution system in which such circuit breaker is installed. The memory means 234 is preferably implemented by using electrically erasable programmable read only memory ("EEPROM") devices 228 for storing programmed instructions therein and random access memory ("RAM") devices 230 for retrievably storing therein information about the circuit breaker, system parameters, status condition, etc. The EEPROM 228 may be programmed locally via the interface circuit 122 or remotely over the data bus 124 via the computer/display unit 126 or by any other suitable means to store the desired instructions for controlling the operation of the circuit breaker 120. The circuit breaker 120 will respond to external instructions received over the data bus 124 when they are addressed to the specific address assigned to the circuit breaker, which may be programmed into the address circuit 238 at the time of manufacture or in the field. Additionally, a data combining means may be provided for combining and extracting data to reduce the number of connections within the circuit means 200.

In operation, the circuit breaker 120 is turned on or off based on an event, such as time of the day. Events may be programmed in the circuit breaker memory means 234 or communicated to the circuit breaker by an external control device, such as the computer/display unit 126. The circuit breaker 120 responds to the instructions only when such instructions are addressed to that circuit breaker.

During operation, the system may operate under any of the three modes: run mode; manual mode; and hold mode. During the run mode, circuit breakers 120 in the electrical distribution system 100 respond automatically to events. All system features operate or function as desired according to programmed instructions contained in the respective circuit breakers or as commanded by the computer/display unit 126 over the data bus 124.

Each circuit breaker 120 may store in its respective memory information about the times of day when the circuit breaker switched from the on to off position or vice versa, current and voltage in each phase of a multiple phase path, electric power, phase angle and the peak current reached during any trip event. Any information which may be sensed through current sensors or voltage sensors may be calculated from such sensed values by the microcontroller 210 and recorded in the memory means 234 or in an external memory such as may be associated with the computer/display unit 126. Such information may be analyzed and evaluated for ongoing system and equipment maintenance and for control purposes.

The memory means 234 may record other information, such as the configuration of the circuit breaker, trip settings of the circuit breaker, and the circuit breaker data, which may include information about the number of times the circuit breaker 120 has tripped, the number of times any contact has cycled, the number of hours in use, circuit breaker type, serial number and the date of manufacture. Such data is useful for circuit breaker troubleshooting and preventive maintenance purposes.

In the manual mode, all circuit breakers preferably are turned on, the events are logged and any outputs from the circuit breaker are updated when the circuit breaker returns to the run mode. During the hold mode, the control signals are processed and the circuit breakers 120 remain in their existing state, but the events are logged and the outputs updated when the circuit breakers return to the run mode. However, local programming at the circuit breaker level or remote programming via the computer and display unit 126 may still be done in any of the modes.

In summary, the electrical power distribution system of the present invention contains a load-center having a plurality of circuit breakers, each such circuit breaker being adapted to communicate with other system elements over a common data bus. The preferred circuit breaker contains a control circuit which causes a current path between a source and a load to be interrupted according to programmed instructions stored in the circuit breaker memory or provided to the circuit breaker by an external control means over the data bus. The circuit breaker contains communications means, which provides communications with other devices over the data bus. The circuit breaker also may contain a status and detection circuit which provides status information about various contacts and current paths within the circuit breaker to the control circuit.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. An electrical power distribution system comprising:
   (a) a load center having a common data bus adapted to provide digital communications; and
   (b) a plurality of circuit breakers coupled to the common data bus, each circuit breaker in said plurality of circuit breakers comprising:
   a first contact and a second contact, the second contact movable between an open position and a closed position, the second contact being spaced from the first contact in the open position and in contact with said first contact in the closed position;
   an actuator for causing the second contact to move between the open position and the closed position; and
   a control circuit having a microcontroller coupled to the actuator for causing the actuator to move the second contact between the open position and the closed position, and between the closed position and open position, according to programmed instructions stored within said control circuit and according to instructions addressed to said control circuit over the common data bus from an external device.

2. The apparatus as specified in claim 1, wherein the load center further contains an interface circuit for providing communications between the circuit breakers and a remote device over the common data bus.

3. The apparatus as specified in claim 1, wherein the load center further contains a display for displaying the status of the circuit breakers.

4. The apparatus as specified in claim 1, wherein the control circuit contains a memory device for storing at least a portion of the programmed instructions.

5. The apparatus as specified in claim 1, wherein the actuator is an electric motor.

6. The apparatus as specified in claim 1, wherein the actuator is a solenoid.

7. An apparatus as specified in claim 1, wherein said external device is a computer.

8. An apparatus as specified in claim 1, wherein the control circuit further comprises a status detection circuit for providing signals to the microcontroller representative of a status of the circuit breaker.

9. A circuit breaker for use in a panel board, capable of being controlled by an external device, comprising:
   (a) a housing for housing the circuit breaker;
   (b) a first contact and a second contact, the second contact movable between an open position and a closed position, the second contact being spaced from the first contact in the open position and in contact with the first contact in the closed position;

(c) an actuator for causing the second contact to move between the open position and the closed position; and (d) a control circuit within the housing, the control circuit having a microcontroller for causing the actuator to move the second contact between the open position and the closed position, and between the closed position and the open position, according to programmed instructions stored within the control circuit and according to instructions addressed to the control circuit over a common data bus from the external device.

10. A circuit breaker as specified in claim 9, wherein the control circuit contains a memory device for storing at least a portion of the programmed instructions.

11. A circuit breaker as specified in claim 9, wherein the control circuit further comprises a status detection circuit for providing signals to the microcontroller representative of a status of the circuit breaker.

12. A circuit breaker as specified in claim 9, wherein the actuator is an electric motor.

13. A circuit breaker as specified in claim 9, wherein the actuator is a solenoid.

14. An electrical power distribution system comprising:

(a) a load center having a common data bus within the load center, said common data bus providing two-way digital communication;

(b) a plurality of circuit breakers within the load center, said circuit breakers communicating with each other and with an external device over the common data bus, each said circuit breaker including:

a first contact and a second contact, the second contact movable between an open position and a closed position, the second contact being spaced from the first contact in the open position and in contact with said first contact in the closed position;

an actuator for causing the second contact to move between the open position and the closed position; and a control circuit having a microcontroller coupled to the actuator for causing the actuator to move the second contact between the open and closed positions according to programmed instructions stored within said control circuit and according to instructions addressed to said control circuit over the common data bus;

(c) an interface circuit within the load center, said interface circuit communicating with an external device and each said circuit breaker, said interface circuit providing instructions received from the external device to the circuit breakers over the common data bus; and (d) a power supply within the load center for providing power to the plurality of circuit breakers.

15. The system of claim 14, wherein the interface circuit communicates at least one status of each said circuit breaker over the common data bus.

* * * * *